US011192349B2

(12) United States Patent
Oderkerk et al.

(10) Patent No.: US 11,192,349 B2
(45) Date of Patent: Dec. 7, 2021

(54) LAMINATED FILM COMPRISING ETHYLENE COPOLYMER

(71) Applicant: BOREALIS AG, Vienna (AT)

(72) Inventors: Jeroen Oderkerk, Stenungsund (SE); Bert Broeders, Beringen (BE); Bernt-Ake Sultan, Stenungsund (SE); Girish Suresh Galgali, Linz (AT); Stefan Hellstrom, Kungalv (SE); Mattias Bergqvist, Stenungsund (SE); Bart Verheule, Schelle (BE); Kristina Akyuz-Karlsson, Odsmal (SE); Urban Andreasson, Odsmal (SE); Francis Costa, Linz (AT); Anh Tuan Tran, Linz (AT)

(73) Assignee: BOREALIS AG, Vienna (AT)

( * ) Notice: Subject to any disclaimer, the term of this patent is extended or adjusted under 35 U.S.C. 154(b) by 503 days.

(21) Appl. No.: 16/082,201

(22) PCT Filed: Mar. 2, 2017

(86) PCT No.: PCT/EP2017/054886
§ 371 (c)(1),
(2) Date: Sep. 4, 2018

(87) PCT Pub. No.: WO2017/162417
PCT Pub. Date: Sep. 28, 2017

(65) Prior Publication Data
US 2020/0290331 A1 Sep. 17, 2020

(30) Foreign Application Priority Data
Mar. 24, 2016 (EP) .................................... 16162255

(51) Int. Cl.
B32B 27/32 (2006.01)
B32B 17/10 (2006.01)
(Continued)

(52) U.S. Cl.
CPC ...... *B32B 27/327* (2013.01); *B32B 17/10678* (2013.01); *B32B 17/10697* (2013.01);
(Continued)

(58) Field of Classification Search
CPC ...... C08L 51/06; C08L 43/04; C08L 2205/02; C08L 23/06; C08L 23/2312; C08L 2203/16; C08L 2203/162; C08L 2203/18; C08L 23/00; C08L 23/02; C08L 23/025; C08L 23/04; C08L 23/08; C08L 23/0807; C08L 23/0815; C08L 23/0823; C08L 23/083; C08L 23/0838; C08L 23/0846; C08L 23/0853; C08L 23/0861; C08L 23/0869; C08L 23/0876; C08L 23/0884; C08L 23/0892; C08L 23/10; C08L 23/12; C08L 23/14; C08L 23/142; C08L 23/145; C08L 23/147; C08L 23/16; C08L 23/18; C08L 23/20; C08L 23/22; C08L 23/24; C08L 23/26; C08L 23/28; C08L 23/283; C08L 23/286; C08L 23/30; C08F 10/10; C08F 2810/20; C08F 230/08; C08F 210/02; C08F 210/04; C08F 210/06; C08F 210/08; C08F 210/14; C08F 210/16; C08F 210/18; C08F 30/08; C08F 2500/07; C08F 2500/08; C08F 2500/09; C08F 2500/10; C08F 2500/21; C08F 2500/22; C08F 2500/26; B32B 15/08; B32B 15/082; B32B 15/085; B32B 7/04; B32B 17/10678; B32B 17/10697; B32B 27/00; B32B 27/02; B32B 27/04; B32B 27/06; B32B 27/065; B32B 27/08; B32B 27/10; B32B 27/12; B32B 27/14; B32B 27/16; B32B 27/18; B32B 27/20; B32B 27/205; B32B 27/22; B32B 27/24; B32B 27/26; B32B 27/28; B32B 27/30; B32B 27/302; B32B 27/304; B32B 27/306; B32B 27/308; B32B 27/32; B32B 27/322; B32B 27/325; B32B 27/327
See application file for complete search history.

(56) References Cited

U.S. PATENT DOCUMENTS 4,600,627 A 7/1986 Toshio et al.
4,619,973 A 10/1986 Smith, Jr.
(Continued)

FOREIGN PATENT DOCUMENTS

CN 103282198 A 9/2013
CN 103459483 A 12/2013
(Continued)

OTHER PUBLICATIONS

Office action for India Patent Application No. 201817038115, dated Dec. 26, 2019.
Chinese Office Action for Application No. 201780014972.8 dated May 13, 2020.
Heino, E-L, et al., "Rheological Characterization of Polyethylene Fractions", Proc. XIth Int. Congr. on Rheology, Brussels, Belgium, Aug. 17-21, 1992, pp. 360-362.
Heino, "The influence of molecular structure on some rheological properties of polyethylene", Annual Transactions of the Nordic Rheology Society, vol. 3, 1995.
(Continued)

*Primary Examiner* — Christopher M Rodd
(74) *Attorney, Agent, or Firm* — Tarolli, Sundheim, Covell & Tummino LLP

(57) ABSTRACT

The invention is a polymer composition for film layer comprising less than 50 wt % of a copolymer of ethylene with silane group(s) containing units and at least 50 wt % of a thermoplastic polyolefine free from silane group(s) wherein the polymer composition has creep of less than 1 mm at 90° C., and an adhesion above 20 N/cm. The invention relates to a laminated article with at least one film layer of the polymer composition and a substrate.

18 Claims, No Drawings

(51) Int. Cl.
  *B32B 27/28* (2006.01)
  *B32B 27/30* (2006.01)
  *C08F 30/08* (2006.01)
  *C08L 23/08* (2006.01)

(52) U.S. Cl.
  CPC ............ *B32B 27/28* (2013.01); *B32B 27/308* (2013.01); *C08F 30/08* (2013.01); *C08L 23/0892* (2013.01); *B32B 2250/02* (2013.01); *B32B 2307/40* (2013.01); *B32B 2307/548* (2013.01); *B32B 2323/046* (2013.01); *C08F 2500/08* (2013.01); *C08F 2500/21* (2013.01); *C08L 2203/16* (2013.01)

(56) References Cited

U.S. PATENT DOCUMENTS

| | | | |
|---|---|---|---|
| 6,982,296 | B2 | 1/2006 | Uwe et al. |
| 2007/0161758 | A1* | 7/2007 | Sultan ............... C08L 23/0892 525/342 |
| 2014/0127505 | A1* | 5/2014 | Dahlen ............... H01B 19/04 428/391 |
| 2014/0295186 | A1* | 10/2014 | Fossum ............... H01B 13/06 428/391 |
| 2017/0011817 | A1* | 1/2017 | Uematsu ............... H01B 3/441 |

FOREIGN PATENT DOCUMENTS

| | | | |
|---|---|---|---|
| EP | 2910595 A1 * | 8/2015 | ............... C08K 3/04 |
| EP | 2910595 A1 | 8/2015 | |
| JP | H0364330 A | 3/1991 | |
| JP | 2012-209335 A | 10/2012 | |
| JP | 2014-157887 A | 8/2014 | |
| JP | 2014-204090 A | 10/2014 | |
| JP | 2014-237756 A | 12/2014 | |
| WO | 2009/056408 A1 | 5/2009 | |
| WO | 2012087441 | 6/2012 | |
| WO | 2012136775 A1 | 10/2012 | |
| WO | 2015/130101 A1 | 9/2015 | |

OTHER PUBLICATIONS

Kaye et al., "Definition of Terms Relating to the Non-Ultimate Mechanical Properties of Polymers", Pure & Appl. Chem., vol. 70, No. 3, pp. 701-754, 1998.

Randall, James, "A Review of High Resolution Liquid 13 Carbon Nuclear Magnetic Resonance Characterizations of Ethylene-Based Polymers", Rev. Macromol. Chem. Phys., C29(2 & 3), 201-317 (1989).

Klimesch, R., et al., "Polyethylene: High-pressure", Encyclopedia of Material Science and Technology, 2001, pp. 7181-7184.

Encyclopedia of Polymer Science and Engineering, vol. 6 (1986), pp. 383-410.

Office action for Japanese Patent Application No. 2018-544486, dated Aug. 20, 2019.

* cited by examiner

LAMINATED FILM COMPRISING ETHYLENE COPOLYMER

FIELD OF INVENTION

This invention relates to a polymer composition for a film layer to be used in a laminate.

The invention also relates to a film layer made of a polymer composition, a laminated article comprising a layer of the polymer composition, to a process for producing of such a laminated article.

BACKGROUND OF INVENTION

There are many and various laminates. The laminate typically comprises at least a substrate layer, e.g. a glass or metal layer, and at least one layer made of a polymer.

One common prior art polymer composition is peroxide crosslinked ethylene-vinyl acetate (EVA) copolymer which is extruded as a sheet from an EVA copolymer composition comprising an organic peroxide as a crosslinking agent and stabilisers. Crosslinking of the EVA is necessary to provide the layer with sufficient strength at higher temperatures, because in use the temperature is typically 40° C. to 80° C.

The laminated film layer is typically produced in a vacuum lamination process. In this process, the components of the laminate, after having been assembled, are put into a vacuum lamination apparatus, in which by application of an increased temperature of about 100° C. to 180° C., and an increased membrane pressure for a time of from about 10 to 30 minutes the laminate is formed under vacuum.

One drawback of peroxide crosslinked EVA as layer in a laminate is the comparatively high temperatures and long lamination times which are caused by the need to decompose the organic peroxide in the laminate and in order to achieve the crosslinking reaction. Thus, the production speed of the laminate is low.

The use of peroxide crosslinked EVA as polymer layer has further drawbacks. It is well known that laminates show optical degradation with time which may occur as a discolouration of the originally colourless, transparent films. Furthermore, other problems have been reported such as delamination at interfaces or damages, penetration of water and arcing, cracking due to expansion/contraction stresses, and weathering.

Polyvinyl butyral (PVB) is a common film layer material for laminates with glass layers. The PVB film has good adhesion and optical properties. The material has a high polarity which attracts water. EVA has the same problem. Furthermore, PVB is extremely soft and tacky. Therefore, the PVB film must be used with a release or liner layer. Otherwise the roller of PVB film will be hard to unwind.

Today, several types of film materials are known, such as peroxide cross-linked ethylene-vinyl acetate (EVA) copolymers (see e.g. U.S. Pat. No. 4,600,627), Polyvinyl butyral (PVB) (see e.g. U.S. Pat. No. 6,982,296), ionoiners (see e.g. U.S. Pat. No. 4,619,973).

It is an object of the present invention to provide a film layer material without the drawbacks of the known technologies, especially of the use of peroxide cross-linked polymers as film material, such EVA, can be avoided. In particular, it is an object of the invention to provide a film layer material which allows to improve and facilitate the production process of the laminated article, e.g. by shortening the time necessary for lamination of the laminate, and, at the same time, has a lower tendency to degrade and decrease delamination.

BRIEF SUMMARY OF INVENTION

The invention is a polymer composition for a film layer comprising
(A) 10 to 50 wt % of a copolymer of ethylene with silane group(s) containing units and
(B) at least 50 wt % of a thermoplastic polyolefine free from silane group(s)
wherein the polymer composition has creep of less than 1 mm at 90° C., when measured as described in "Test methods", and an adhesion of above 20 N/cm, when measured as described in "Test methods".

Polymers are defined to have more than at least 1000 repeating units. The copolymer of ethylene has more than 50 wt % of ethylene monomer.

The silane group(s) increase adhesion to a substrate, for example to the silane group(s) in a glass layer, whereby a good adhesion will be achieved. This means that the polymer is compatible with the glass layer. This is shown in the examples part.

The definition thermoplastic means that the polyolefin is processable as a melt above a specific temperature, and returns to a solid state upon cooling.

Moreover, the polymer composition of the invention provides a film layer with low creep in combination with good film extrusion properties. Furthermore the film layer is easy to process and causes no bubbles, because the copolymer of ethylene (A) with silane group(s) containing units improves extrusion properties. One benefit of the invention is that the copolymer of ethylene (A) with silane group(s) containing units works as an adhesion promoter and at the same time improves the creep properties. This will reduce complexity of the polymer composition and consequently make the system more robust. Another benefit from more robust system is less discarded material, due to for example broader temperature lamination window.

Polyolefin means herein a polymer comprising of mainly ethylene and alfa-olefines (alkenes), typically ethylene, propylene, butylene, hexene and octene or mixtures thereof.

Laminate means that several layer are laminated. The invention comprises a substrate and film layer comprising the polymer composition according to the invention. The laminate can also comprise further layers depending on the end application. Such laminate are typically referred to as multilayer laminates.

Moreover, the polymer composition of the invention provides surprisingly good optical properties and superior processability properties.

Accordingly, the polymer composition of the invention provides a good balance of low creep, good optical properties together with a good adhesion to a substrate, such as metal or glass substrate. The examples below show the said balance of properties without sacrificing the overall performance.

One object of the invention is to provide a film layer for laminate with good high temperature properties.

Preferably, no peroxide residues are present in the polymer composition of the invention. More preferably, no free silane molecules will be present in the polymer composition of the invention. These are surface active and will consequently be enriched between the different layers of the laminated article. They are an obvious starting point for delamination.

Furthermore, the polymer composition of the invention thus provides a blend with good optical properties, good adhesion to glass and good long term properties such as low water uptake, which prevent delamination. Another advantage of the polymer composition is while retaining good adhesion to glass is the adhesion to itself moderate, i.e. no release or linear layer is required when the polymer composition is used as a film in a roll.

DETAILED DESCRIPTION OF INVENTION

In one embodiment of the invention the copolymer of ethylene (A) with silane group(s) containing units is in an amount from 10 to 45 wt %, suitably 25 to 45 wt %, most suitably 30 to 40 wt %, based on the total weight of the polymer composition.

The amount should be well balanced in order to get good creep properties, optimize adhesion while retaining good optical properties. Further the copolymer of ethylene (A) with silane group(s) containing units suitably has a density above 910 kg/m$^3$, more suitably above 920 kg/m$^3$. If the density is to low the creep will be too high. The copolymer of ethylene (A) with silane group(s) containing units suitably has a density less than 960 kg/m$^3$, more suitably less than 930 kg/m$^3$.

The copolymer of ethylene (A) with silane group(s) containing units suitably has an MFR$_2$ of 0.1 to 40 g/10 min, preferably 0.5 to 15 g/10 min and most preferably 0.75 to 4 g/10 min. The silane content is 0.1 to 10 wt %, preferably 1 to 5 wt % and most preferably 1.5 to 3 wt %. The amount of silane should be enough to provide a good adhesion.

The copolymer of ethylene (A) with silane group(s) containing units can be made by several conventional processes. The silane is suitably hydrolysable, i.e. crosslinkable. The hydrolysable silane group(s) may be introduced into the copolymer of ethylene by copolymerisation of e.g. ethylene monomers with silane group containing comonomer(s) or by grafting, i.e. by chemical modification of the polymer by addition of silane group(s) mostly in a radical reaction, as well known in the art. Benefits of copolymerisation are that no polar peroxide residues or unreacted vinyl silanes are present in the final article. This will make the final product more uniform, with better consistency and improve quality. Storage stability of the copolymerised ethylene with vinyl triethoxy silane and/or vinyl trimethoxy silane made in a high pressure radical process is greatly improved compared to grafted solutions. Another benefit is less handling liquid vinyl silanes, which are flammable and have a strong odour. Further benefits are less scrape, less scorch (premature crosslinking in extruder) and longer production runs (less cleaning of extruders). Copolymerisation is the preferred production process of the copolymer of ethylene (A) with silane group(s) containing units. The amount of silane group(s) can be decreased compared to grafting while retaining same adhesion. The reason for this is that all silane group(s) are copolymerised while grafted polymer usually contains unreacted silane with peroxide residues.

The copolymer of ethylene (A) with silane group(s) containing units suitably is a low density polymer of ethylene containing silane group(s).

High pressure radical process is produced at high pressure by free radical initiated polymerisation (referred to as high pressure (HP) radical polymerisation), optionally using a chain transfer agent (CTA) to control the MFR of the polymer. The HP reactor can be e.g. a well-known tubular or autoclave reactor or a combination thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

Further details of the production of (co)polymers of ethylene by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

In one embodiment no peroxide has been added in the copolymer of ethylene (A) with silane group(s) containing units. This embodiment requires that the hydrolysable silane group(s) are introduced into the copolymer of ethylene (A) with silane group(s) containing units by copolymerisation in a high pressure reactor.

The polymer composition has an adhesion above 20 N/cm as measured as described in "Test methods", preferably an adhesion above 50 N/cm and most preferably above 80 N/cm.

Accordingly, the polymer composition of the invention enables to reduce as much as possible all liquid additives in the polymer composition, such as silanes and peroxides. This will decrease problems with for example exudation, meaning the film made from the composition will be less sticky, odour less (improving working conditions significantly) and improves shelf life of the film as such. No residues can be enriched in boundaries between layers in the laminated article. This will reduce risk for bubbles and delamination.

The silane group(s) containing comonomer for copolymerising silane group(s) or the silane group(s) containing compound for grafting silane group(s) to produce copolymer of ethylene (A) is preferably an unsaturated silane compound represented by the formula $$R^1SiR^2_qY_{3-q} \qquad (I)$$

wherein

R$^1$ is an ethylenically unsaturated hydrocarbyl, hydrocarbyloxy or (meth)acryloxy hydrocarbyl group, each R$^2$ is independently an aliphatic saturated hydrocarbyl group, Y which may be the same or different, is a hydrolysable organic group and q is 0, 1 or 2.

Special examples of the unsaturated silane compound are those wherein R$^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl-or arylamino group; and R$^2$, if present, is a f wherein R$^1$ is vinyl, allyl, isopropenyl, butenyl, cyclohexanyl or gamma-(meth) acryloxy propyl; Y is methoxy, ethoxy.

Most preferred copolymer of ethylene (A) with silane group(s) containing units is a copolymer of ethylene with silane group(s) containing comonomer.

One embodiment is copolymerising the ethylene monomer with vinyl triethoxy silane or vinyl trimethoxy silane comonomer in a high pressure radical process to produce the copolymer of ethylene (A) with a copolymer with silane group(s) containing units.

The copolymer of ethylene (A) with silane group(s) containing units may contain further comonomer(s) which are other than silane group(s) containing comonomer.

Moreover, the copolymer of ethylene (A) with silane group(s) containing units may contain further polar group(s) other than silane group(s) (referred herein as polar group(s)). In one embodiment the copolymer of ethylene (A) with silane group(s) containing units contains also polar group(s), which may be introduced by grafting a polar group(s) containing compound or by copolymerising a polar group(s) containing comonomer (herein referred as polar comonomer). In this embodiment, the copolymer of ethylene (A) is produced by polymerising ethylene monomer with silane group(s) containing comonomer and with at least one, suitably one, polar comonomer.

In one embodiment the copolymer of ethylene (A) with silane group(s) containing units is selected from a polymer of consisting of ethylene monomer and silane group(s) containing comonomer and a polymer consisting of ethylene monomer with silane group(s) containing comonomer and one or more, suitably one, polar comonomer.

Typical polar comonomers are vinyl esters of monocarboxylic acids having 1 to 4 carbon atoms, such as vinyl acetate (EVA), and (meth)acrylates of alcohols having 1 to 4 carbon atoms, such as methyl (meth)acrylate (EMA & EMMA). Especially preferable polar comonomers are butyl acrylate (EBA), ethyl acrylate (EEA) and methyl acrylate (EMA). The most preferable polar comonomer is EMA. The term "(meth)acrylic acid" is intended to embrace both acrylic acid and methacrylic acid.

The amount of polar comonomer units in the terpolymer is preferably 5 to 40 wt %, in suitably 10 to 30 wt %, and yet more suitably between 15 and 30 wt %.

In a more preferred embodiment lower polar comonomer content is desired, in which the total amount of polar comonomers in the terpolymer is from 1 to 20 wt %, suitably 5 to 15 wt %. The polar comonomer suitably is selected from EVA, EBA, EMA, EMMA & EEA or mixtures thereof, most suitably from EBA, EMA and EEA.

The copolymer of ethylene (A) with silane group(s) containing units is most suitably less than 1 wt % of polar comonomers excluding the silane group(s).

In another embodiment the thermoplastic polyolefin free from silane group(s) (B) is present in an amount from 60 to 90 wt %, suitably 55 to 75 wt %, based on the total weight of the polymer composition.

The thermoplastic polyolefin free from silane group(s) (B) suitably is a thermoplastic elastomer polymer of ethylene. Thermoplastic elastomers (TPE), sometimes referred to as thermoplastic rubbers, are a class of copolymers which consist of materials with both thermoplastic and elastomeric properties. TPE has three essential characteristics:

1. The ability to be stretched to moderate elongations and, upon the removal of stress, return to something close to its original shape.
2. Processable as a melt above a specific temperature, and returns to a solid state upon cooling.
3. Absence of significant creep.

The thermoplastic elastomer polymer of ethylene should have a low crystallinity in order to be elastic. The degree of crystallinity is typically 40 wt % or below and can even be lower than 30 wt %.

The thermoplastic elastomer polymer of ethylene should have more than 50 wt % of ethylene monomer.

The degree of crystallinity of the preferable thermoplastic elastomer is preferably 40 wt % or below and can even be lower than 30 wt %. Such degree of crystallinity provides good elasticity properties.

In one embodiment of the invention the thermoplastic polyolefin free from silane group(s) (B) is a thermoplastic elastomer polymer of ethylene, such as a copolymer of ethylene, such as a plastomer (E). The plastomer (E) can be a polyolefin, suitable a copolymer of ethylene and alfa-copolymer(s).

Plastomer (E) means herein a very low density polyolefin, more preferably very low density polyolefin polymerised using single site, preferably metallocene catalyst. Typically, the polyolefin plastomer (E) are ethylene copolymers. These polyolefin plastomers (E) usually have a density of less than 915 kg/m$^3$, suitably less than 905 kg/m$^3$, more suitably less than 891 kg/m$^3$ and most suitably less than 881 kg/m$^3$. The density usually is above 860 kg/m$^3$, more suitably more than 880 kg/m$^3$. The polyolefin plastomers (E) have a melt flow rate, of less than about 40 g/10 min, suitably between 2 and 20 g/10 min and more suitably between 4 and 10 g/10 min.

In one preferred embodiment the polyolefin plastomers (E) are prepared with at least one metallocene catalyst which has a well-known meaning in the art. The plastomer (E) resin may also be prepared with more than one metallocene catalyst or may be a blend of multiple plastomer resins prepared with different metallocene catalysts. In some embodiments, the plastomer (E) is a substantially linear ethylene polymer (SLEP). SLEPs and other metallocene catalysed plastomers (E) are known in the art, for example, U.S. Pat. No. 5,272,236. Plastomer resins produced with metallocene catalysts are also commercially available, for example, as Queo™ plastomers available from Borealis, ENGAGE™ plastomer resins available from Dow Chemical Co. or EXACT™ polymers from Exxon or TAFMER™ polymers from Mitsui.

The polymer components of the polymer composition of the invention may be in form of a homogeneous (one phase system) mixture or in form of a heterogeneous mixture (at least partly separate phase system).

In one preferable embodiment of a film layer of a laminated article the copolymer of ethylene (A) with silane group(s) containing units is a copolymer consisting of units of ethylene and units of silane group(s) containing comonoiner and the thermoplastic polyolefin is in one phase (homogeneous). It means that all polymer components which preferably consist of the copolymer of ethylene (A) with silane group(s) containing units and thermoplastic polyolefine free from silane group(s) (B), in the polymer composition are compatible (i.e. miscible). The one phase system contributes to the optical properties.

Preferably the polymer composition has less than 1 wt % of soft phase as measured in "Test methods".

In one embodiment of the invention the total amount of silane group(s) in the polymer composition is less than 1 wt %, suitably 0.75 wt %. The minimum amount of silane group(s) is at least 0.1 wt %, suitably 0.3 wt %. The amount of silane group(s) is measured as described in "Test methods".

The polymer composition of the invention enables to have decreased total amount of silane group(s) without sacrificing inter alia adhesion, mechanical, such as creep, and optical properties, which is very advantageous for laminated article applications. The benefit is less polar group(s) in the polymer composition which can reduce water concentration in the laminated article. It will also reduce the overall cost of the polymer composition.

The polymer composition according to the invention has suitably a density of from 860 to 910 kg/m$^3$, suitably 870 to 905 kg/m$^3$ and most suitably 875 to 900 kg/m$^3$. The lower the density is the better are the optical properties. The higher density is the better is the creep performance.

The laminated film layer is typically produced in a vacuum lamination process. In this process, the components of the laminate, after having been assembled, are put into a vacuum lamination apparatus, in which by application of an increased temperature of about 130° C. to 170° C., suitably 140° C. to 160° C., and an increased membrane pressure for a time of from 6 to 30 min, suitably 10 to 30 min, more suitably 10 to 20 min, the laminate is formed under vacuum.

In one embodiment the polymer composition is free from peroxides. The polymer composition of the invention is preferably produced by polymerising the copolymer of ethylene (A) with silane group(s) containing units in a high pressure radical process. The polymer composition of the invention has very good creep properties, whereby the step of crosslinking with peroxide can be avoided. When producing the laminated article the crosslinking with peroxide during the lamination step of the film elements can be avoided; this simplifies the process and is advantageous for the use life of the laminated article.

Another advantage of the invention is a broader temperature window of the lamination step and reduced lamination time.

The polymer composition according to the invention may further contain various additives, such as, antioxidants, metal deactivators, further stabilizers e.g. process stabilizers, lubricants, colouring agents and UV stabilizers in an amount of 0.1 wt % to 8 wt %, based on the total weight of the polymer composition.

Preferably the combined amount (wt %) of the copolymer of ethylene (A) with silane group(s) containing units and the thermoplastic polyolefin (B) is more than 80 wt % and more suitably more than 90 wt % and even more suitably more than 95 wt % in the base resin. Most preferably the polymer composition of the invention consists of the copolymer of ethylene (A) with silane group(s) containing units and the thermoplastic polyolefin (B) as the sole polymeric components. It is to be understood that the polymer composition of the invention may also comprise, and preferably comprises, additives as defined above. Moreover, the additives can be present in form of a master batch as well known in the art, wherein the additive is in a mixture with a carrier polymer. In such case the carrier polymer of the master batch will not be counted as polymeric components in the polymer composition. It will be counted as additive.

In another embodiment of the invention the polymer composition comprises a condensation catalyst (F). The condensation catalyst (F) should be able to crosslinking the silane group(s) presents in the polymer composition of the invention. The condensation catalyst can be added as a master batch, directly to the polymer composition of the invention or by migration. Moreover, said condensation catalyst can be added as a liquid by direct injection in to an extruder, such as a film extruder or mix the condensation catalyst with the polymer composition and feed the mixture to the extruder, such as a film extruder. The decisive factor is the activity of the condensation catalyst. The amount of catalyst sufficient to cure the silane-functionalized polymer will generally depend on the specific type selected, but will preferably range from about 0.01 to 1 parts by weight per 100 parts by weight of the silane polymer.

Accordingly, the condensation catalyst can be added to the polymer composition as a master batch by dry blending the polymer composition pellets a with the masterbatch pellets prior to feeding to an extruder. The condensation catalyst can be added by migration. This is accomplished by allowing the condensation catalyst for example to migrate from another layer that is in direct or indirectly in contact with the layer that shall be crosslinked.

Another embodiment of the invention relates to a process for adding a condensation catalyst to an extruder comprising mixing the copolymer of ethylene (A) with silane group(s) containing units with the thermoplastic polyolefin (B) and the liquid condensation catalyst in a pre-mixer prior to the extruder, such as a film extruder, extrude said mixture and form a film and crosslink said film at appropriate time, i.e. after lamination into a laminated article. The copolymer of ethylene (A) with silane group(s) containing units and the thermoplastic polyolefin (B) can be as separate pellets or be pre-compounded in a separate step.

The film layer according to the invention preferably is laminated. The benefits of the film are faster lamination time and broader temperature window for both making the film and lamination of the film. In one embodiment of the invention the laminated article comprises at least one film layer comprising the polymer composition as defined in any of the preceding embodiments, preferably the laminated article comprising a substrate layer, suitably a glass layer or a metal layer and at least one layer wherein the at least one layer comprises, preferably consists, is made of a polymer composition according to any of the preceding embodiments. Suitably should the film layer comprising the polymer composition as defined in any of the preceding embodiments be adjacent and in direct contact with the substrate. Preferably the laminated article has a front and rear glass layer and one layer made of a polymer composition according to any one of the previous embodiments.

The invention further comprises a laminated article according to any one of the previous embodiments in which the creep is less than 1 mm at 90° C., when measured as described in "Test methods" and an adhesion above 20 N/cm, when measured as described in "Test methods". The laminate has preferably an adhesion above 50 N/cm and most preferably above 80 N/cm.

The invention also relates to a process for laminate the polymer composition according to any above described embodiments wherein the polymer composition is laminated at 100 to 160° C.

Test Methods a) Melt Flow Rate

The melt flow rate MFR2 was measured in accordance with ISO 1133 at 190° C. and a load of 2.16 kg for ethylene homo and copolymers.

b) Density: The density was measured according to ISO 1183D and ISO1872-2 for sample preparation.

c) The content (wt % and mol %) of polar comonomer present in the polymer and the content (wt % and mol %) of silane group(s) containing units (preferably comonomer) present in the polymer composition (preferably in the polymer):

Quantitative nuclear-magnetic resonance (NMR) spectroscopy was used to quantify the comonomer content of the polymer in the polymer composition.

Quantitative $^1$H NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-d$_2$ (TCE-d$_2$) using ditertiarybutylhydroxytoluen (BHT) (CAS 128-37-0) as stabiliser. Standard single-pulse excitation was employed utilising a 30 degree pulse, a relaxation delay of 3 s and no sample rotation. A total of 16 transients were acquired per spectra using 2 dummy scans. A total of 32k data points were collected per FID with a dwell time of 60 µs, which corresponded to a spectral window of approx. 20 ppm. The FID was then zero filled to 64k data points and an exponential window function applied with 0.3 Hz line-broadening. This setup was chosen primarily for the ability to resolve the quantitative signals resulting from methylacrylate and vinyltrimethylsiloxane copolymerisation when present in the same polymer.

Quantitative $^1$H NMR spectra were processed, integrated and quantitative properties determined using custom spectral analysis automation programs. All chemical shifts were internally referenced to the residual protonated solvent signal at 5.95 ppm.

When present characteristic signals resulting from the incorporation of vinylacytate (VA), methyl acrylate (MA), butylacrylate (BA) and vinyltrimethylsiloxane (VTMS), in various comonomer sequences, were observed (Randell89). All comonomer contents calculated with respect to all other monomers present in the polymer.

The vinylacytate (VA) incorporation was quantified using the integral of the signal at 4.84 ppm assigned to the *VA sites, accounting for the number of reporting nuclie per comonomer and correcting for the overlap of the OH protons from BHT when present:

$$VA=(I_{*VA}-(I_{ArBHT})/2)/1$$

The methylacrylate (MA) incorporation was quantified using the integral of the signal at 3.65 ppm assigned to the 1 MA sites, accounting for the number of reporting nuclie per comonomer:

$$MA=I_{1MA}/3$$

The butylacrylate (BA) incorporation was quantified using the integral of the signal at 4.08 ppm assigned to the 4 BA sites, accounting for the number of reporting nuclie per comonomer:

$$BA=I_{2BA}/2$$

The vinyltrimethylsiloxane incorporation was quantified using the integral of the signal at 3.56 ppm assigned to the 1 VTMS sites, accounting for the number of reporting nuclei per comonomer:

$$VTMS=I_{1VTMS}/9$$

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

$$BHT=I_{ArBHT}/2$$

The ethylene comonomer content was quantified using the integral of the bulk aliphatic (bulk) signal between 0.00-3.00 ppm. This integral may include the 1 VA (3) and α VA (2) sites from isolated vinylacetate incorporation, *MA and α MA sites from isolated methylacrylate incorporation, 1 BA (3), 2 BA (2), 3 BA (2), *BA (1) and α BA (2) sites from isolated butylacrylate incorporation, the *VTMS and α VTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

$$E=(1/4)*[I_{bulk}-5*VA-3*MA-10*BA-3*VTMS-21*BHT]$$

It should be noted that half of the α signals in the bulk signal represent ethylene and not comonomer and that an insignificant error is introduced due to the inability to compensate for the two saturated chain ends (S) without associated branch sites.

The total mole fractions of a given monomer (M) in the polymer was calculated as:

$$fM=M/(E+VA+MA+BA+VTMS)$$

The total comonomer incorporation of a given monomer (M) in mole percent was calculated from the mole fractions in the standard manner:

$$M\ [mol\ \%]=100*fM$$

The total comonomer incorporation of a given monomer (M) in weight percent was calculated from the mole fractions and molecular weight of the monomer (MW) in the standard manner:

$$M\ [wt\ \%]=100*(fM*MW)/((fVA*86.09)+(fMA*86.09)+(fBA*128.17)+(fVTMS*148.23)+((1-NA-fMA-fBA-fVTMS)*28.05))$$

randall89
J. Randall, Macromol. Sci., Rev. Macromol. Chem. Phys. 1989, C29, 201.

It is evident for a skilled person that the above principle can be adapted similarly to quantify content of any further polar comonomer(s) which is other than MA BA and VA, if within the definition of the polar comonomer as given in the present application, and to quantify content of any further silane group(s) containing units which is other than VTMS, if within the definition of silane group(s) containing units as given in the present application, by using the integral of the respective characteristic signal.

d) Creep

Films of 0.45 mm thickness were prepared from the sample. Two samples of 30 mm*120 mm were cut from the film. Two planar surface glass slides of, 30 mm*150 mm*3.85 mm thick, were washed with isopropanol and dried were prepared. Two masks from Teflon (0.1 mm thick) with a hole of 100 mm*15 mm were also prepared.

A creep test specimen was prepared having the structure glass, mask, film, film, mask and glass. The glass slides were positioned having an offset of 20 mm. The test specimen was vacuum laminated at 150° C., 300 seconds evacuation time, 660 seconds pressing time with 800 mbar membrane pressure in a P. Energy L036LAB. The Teflon masks were preventing the polymer films to flow out, giving a well specified width and length of the laminated film.

After lamination, the Teflon masks and excess film that had not been in contact with the glass were removed. The test specimen was marked with a distance of 75 mm, corresponding to zero creep. The test specimen was inserted vertically in an oven, with specified temperature, only supporting one of the glass slides. The creep was measured as the distance relative to zero creep at specified times, thereby obtaining the distance the test specimen had moved during the test.

The creep can be seen as resistance to disposition at high temperatures of the laminate.

e) Transmittance

Films of 0.45 mm were prepared from the polymer sample. The films were conditioned according to the standard specifications.

One film was put between two glass slides (with a thickness of 1.0 mm and a total transmittance of 91.6% between 400 nm and 1150 nm) and the sample was vacuum laminated at 150° C., 150 seconds evacuation time, 300 seconds pressing time with a 200 mbar membrane pressure in a P. Energy L036LAB.

The transmittance between 400 nm and 1150 nm was recorded with a Perkin Elmer Lambda 900 UV/VIS/NIR spectrometer equipped with a 150 mm integrating sphere. The solar weighted transmittance between 400 nm and 1150 nm was calculated using Formula 1 according to draft standard IEC 82/666/NP using the reference spectral photon irradiance as given in IEC 60904-3.

Transmittance can be seen as the total amount of light going through the sample including scattered and parallel transmittance (direct).

f) Adhesion

The extruded films with a thickness of 0.45 mm were used for the adhesion measurements. The adhesion strength was measured on standard window glass washed with isopropanol and dried. Adhesion samples were prepared by lamination of two films on a glass plate (dimensions 30×300×4 mm (b*l*d)) with a Teflon stripe between the glass and the film for the adhesion test measurement. On top of the two films also a back-sheet was placed before the lamination. Lamination was done at 150° C. for 15 minutes and a pressure of 800 mbar using a fully automated laminator P. Energy L036LAB. After the lamination the Teflon stripe was removed. A specimen was sliced out of the sample glass with a width of 15 mm for the peel strength measurement. The adhesion was measured on an Alwetron TCT 25 tensile machine with a peeling angle of 90° C. and a peeling speed of 100 mm/min. The peeling test was performed up to 100 mm elongation while constant measuring the peal force with a load cell of 1 kN. The maximum, minimum and mean force (N) was taken from the measurement. The adhesion (N/cm) was measured from the mean force divided by the width of the specimen (15 mm).

g) Water Uptake Measurement

The water uptake measurements were done on the extruded films with a thickness of 0.45 mm and a length of 200 mm. The examined films were conditioned for 3 weeks in a constant room at 23° C. and a RH of 50%. Water uptake Determination of the total water content in the samples was done by Karl-Fisher titration. Equipment used is the Mettler DL39 Coulometric KF Titrator. The samples have been heated up till 180° C. for the total water content measurement.

g) Dynamic Shear Measurements (Frequency Sweep Measurements)

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively $\omega$ is the angular frequency $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, $\eta^*$, the dynamic shear viscosity, $\eta'$, the out-of-phase component of the complex shear viscosity $\eta''$ and the loss tangent, tan $\delta$ which can be expressed as follows:

$$G' = \frac{\sigma_0}{\gamma_0} \cos\delta \ [\text{Pa}] \quad (3)$$

$$G'' = \frac{\sigma_0}{\gamma_0} \sin\delta \ [\text{Pa}] \quad (4)$$

$$G^* = G' + iG'' \ [\text{Pa}] \quad (5)$$

$$\eta^* = \eta' - i\eta'' \ [\text{Pa} \cdot s] \quad (6)$$

$$\eta' = \frac{G''}{\omega} \ [\text{Pa} \cdot s] \quad (7)$$

$$\eta'' = \frac{G'}{\omega} \ [\text{Pa} \cdot s] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (9).

$$EI(x) = G' \text{ for } (G'' = x \text{ kPa})[\text{Pa}] \quad (9)$$

For example, the EI(5 kPa) is the defined by the value of the storage modulus G', determined for a value of G" equal to 5 kPa.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

Compounding of the Blends

The different compounds were compounded on a pilot scale extruder (Prism TSE 24TC). The obtained mixture was melt mixed in conditions given in the table below and extruded to a string and pelletized.

| Set Values Temperatures (° C.) | | | | | | Extruder | | |
|---|---|---|---|---|---|---|---|---|
| Zone 1 | Zone 2 | Zone 3 | Zone 4 | Zone 5 | Zone 6 | rpm | output | pressure |
| 120° C. | 140° C. | 140° C. | 140° C. | 135° C. | 130° C. | 222 | 7.7 kg/h | 55 bar |

Film Sample Preparation:

Films (tapes) with a dimension of 50 mm width and 0.45 mm thickness were extruded on a Collin teach-line E 20T extruder for the adhesion and transmittance measurements. The tapes were produced with the following set temperatures:

150/150/150° C. and 50 rpm.

EXAMPLES

Materials

EVS (1.9 wt %): VTMS-ethylene copolymer produced by a high-pressure tubular reactor in a conventional manner using conventional peroxide initiator, with a max temperature of 285° C., where ethylene monomers were reacted with vinyl trimethoxysilane (VTMS) amounts so as to yield 1.9 wt % silane content in the copolymer. CTA was used to regulate MFR as well known for a skilled person. The melt flow rate (MFR2@190° C.) according to ISO 1133 (190° C., 2.16 kg) which is 1 g/10 min.

UL04331, EVA (43 wt %): Ethylene vinyl acetate (EVA) copolymer, having a melt flow rate (MFR2@190° C.) according to ISO 1133 (190° C., 2.16 kg) which is 31 g/10 min and the content of vinyl acetate which is 43 wt % with regard to the total amount of monomers for the EVA. The saturated polyolefin were prepared by a high pressure polymerisation process. Produced and sold by Exxon Chemicals.

Queo 8201: Copolymer of ethylene and 1-octene having a density of 882 kg/m3 and a melt flow rate according to ISO 1133 (190° C., 2.16 kg) which is 1 g/10 min. The polymer is produced with a metallocene catalyst in a solution polymerisation process. It is commercially available from Borealis.

Queo 2M135: Copolymer of ethylene and 1-octene having a density of 882 kg/m3 and a melt flow rate according to ISO 1133 (190° C., 2.16 kg) which is 7 g/10 min. The polymer is produced with a metallocene catalyst in a solution polymerisation process. It is commercially available from Borealis.

EVS (1.3 wt %) MA (24 wt %) Terpolymer produced by a high-pressure (250MPa) tubular reactor in a conventional manner using conventional peroxide initiator, with a max temperature of 285° C., where ethylene monomers were reacted with vinyl trimethoxysilane (VTMS) and methylacrylate (MA) co-monomers amounts so as to yield 1.3 wt % silane content and 24 wt % MA content in the terpolymer. CTA was used to regulate MFR as well known for a skilled person. The melt flow rate (MFR2@190° C.) according to ISO 1133 (190° C., 2.16 kg) which is 25 g/10 min.

PVB from Solutia, Saflex PVB PA61

Results

Table 1 shows the impact on creep performance when adding EVS (1.9 wt %) with a higher melting temperature. Adding 20% of EVS (1.9 wt %) to Queo 8201 will make the sample pass the creep test at 110° C. In this test is the preferred composition 20% EVS (1.9 wt %), 80% Queo 8201, solving the creep issue while having a limited influence on optical performance.

TABLE 1

Results on creep test. Tests were sequentially performed starting at 90° C..

| EVS (1.9 wt %) | Queo 8201 | Creep 90° C. Movement after 48 h | Creep 110° C. Movement after 72 h | Creep 115° C. Movement after 18 h |
|---|---|---|---|---|
| 100 | 0 | 0 mm | 0 mm | 0 mm |
| 80 | 20 | 0 mm | 0 mm | 1 mm |
| 60 | 40 | 0 mm | 0 mm | 5 mm |
| 40 | 60 | 0 mm | 0 mm | 10 mm |
| 20 | 80 | 0 mm | 0 mm | 7 mm |
| 0 | 100 | >20 mm | Failure | Failure |

The results at 115° C. indicates that the absence of creep at 110° C. is a result of the high melting temperature of EVS (1.9 wt %). When passing the melting point of EVS (1.9 wt %) (Tm is 108° C.) the samples start to creep. However, after 48 h at 115° C. the samples had not moved relative to the results after 18 h. Results in Table 2 concludes that a blend of EVS (1.9 wt %): Queo 8201 (20:80) does not need to be crosslinked to pass the creep test at 110° C.

Transmittance of pure plastomer and plastomer/EVS blends using an integrating sphere.

TABLE 2

| Transmittance of blends | | |
|---|---|---|
| EVS | Total transmittance 400-1150 nm. | |
| (1.9 wt %) | Queo 8201 | Queo 2M135 |
| 0% | 89.7% | 90.4% |
| 10% | | 88.1% |
| 20% | 87.5% | 86.6% |
| 30% | | 85.4% |
| 40% | 86.2% | 84.3% |

By adding up till 40 wt % of an EVS (1.9 wt %) copolymer into the Queo Plastomer material the total transmittance is still on such a high level to make these Queo Plastomer compounds with EVS is an excellent material to be used as film material in a laminated article.

TABLE 3

| Adhesion of the blends of Queo2M135 and EVS (1.9 wt %) | | | | |
|---|---|---|---|---|
| Sample | Max. Force (N) | Min. Force (N) | Mean Force (N) | Adhesion (N/cm) |
| 100% QUEO 2M135 | | | no adhesion | |
| 10% EVS (1.9 wt %) 90% Queo 2M135 | 101 | 43 | 55 | 37 |
| 20% EVS (1.9 wt %) 80% Queo 2M135 | 128 | 37 | 99 | 67 |
| 30% EVS (1.9 wt %) 70% Queo 2M135 | 179 | 67 | 118 | 78 |
| 40% EVS (1.9 wt %) 60% Queo 2M135 | 260 | — | 264 | 176 |

TABLE 3-continued

Adhesion of the blends of Queo2M135 and EVS (1.9 wt %)

| Sample | Max. Force (N) | Min. Force (N) | Mean Force (N) | Adhesion (N/cm) |
|---|---|---|---|---|
| 60% EVS (1.9 wt %) 40% Queo 2M135 | | 47 | 60 | 40 |
| 70% EVS (1.9 wt %) 30% Queo 2M135 | 68 | 30 | 44 | 29 |
| 80% EVS (1.9 wt %) 20% Queo 2M135 | | | no adhesion | |
| 90% EVS (1.9 wt %) 10% Queo 2M135 | | | no adhesion | |
| 100% EVS (1.9 wt %) | | | no adhesion | |

Pure Queo 2M135 shows no adhesion to glass due to the lack of trimethoxysilane groups, see Table 3. By blending in an EVS copolymer into the plastomer the adhesion increases with the amount of EVS due to the higher amount of silane in the compound. By adding 60 wt % of and EVS copolymer or more the adhesion surprisingly decreases instead of a higher amount of silane groups in the compound.

TABLE 4

Water uptake

| EVA UL043 31 | PVB Solutia | Queo 2M135 | Queo 8201 | EVS (1.9 wt %) | EVS (1.3 wt %) MA (24 wt %) | 2M135/ EVS (1.9 wt %) 90/10 wt % | 2M135/ EVS (1.9 wt %) 80/20 wt % | 2M135/ EVS (1.9 wt %) 70/30 w t% |
|---|---|---|---|---|---|---|---|---|
| 764 ppm | 925 ppm | 13 ppm | 32 ppm | 32 ppm | 185 ppm | 45 ppm | 34 ppm | 32 ppm |

The water uptake measurements were done on the extruded films with a thickness of 0.45 mm and a length of 200 mm. The examined films were conditioned for 3 weeks in a constant room at 23° C. and a RH of 50%. The plastomer and EVS copolymer blends have a very low water uptake, see Table 4. Film materials should have very low or near zero water uptake and low water vapour transmission rate.

TABLE 5

Adding EVS (1.9 wt %) works as process aid for Queo8201

| | η* 0.05 rad/s [Pa · s] | η* 300 rad/s [Pa · s] | SHI (0.05/300) | MFR (190, 2.16) |
|---|---|---|---|---|
| EVS (1.9 wt %)/ Queo8230 (20/80) | 799 | 186 | 4.29 | 14.68 |
| EVS (1.9 wt %)/ Queo8230 (40/60) | 2063 | 218 | 9.46 | 7.87 |
| EVS (1.9 wt %)/ Queo8230 (60/40) | 5010 | 251 | 19.96 | 3.81 |
| EVS (1.9 wt %)/ Queo8230 (80/20) | 10800 | 288 | 37.5 | 1.68 |
| EVS (1.9 wt %)/ Queo8201 (20/80) | 14020 | 708 | 19.80 | 0.96 |
| EVS (1.9 wt %)/ Queo8201 (80/20) | 19960 | 413 | 48.32 | 0.72 |

The samples were compounded as above. The rheological parameters of the blends are given in the table 5. The SHI as calculated by ratio of viscosity at 0.05/300 rad·s−1, clearly shows that with increasing amount of the EVS (1.9 wt %) the shear thinning increases, meaning the processability at high shear stress is improved.

TABLE 6 blends of Queo and EVS copolymer and EVS MA terpolymer

| Blend | Composition | Soft Phase (%) |
|---|---|---|
| Queo 2M135/EVS (1.9 wt %) | 60/40 | <0.1 |
| Queo 2M135/EVS (1.9 wt %) | 80/20 | <0.1 |
| Queo 2M135/EVS (1.9 wt %) | 20/80 | <0.1 |
| Queo 8201/EVS (1.9 wt %) | 20/80 | 0.2 |
| Queo 8201/EVS (1.9 wt %) | 40/60 | 0.4 |
| Queo 8201/EVS (1.9 wt %) | 60/40 | 0.1 |
| Exact 8230/EVS (1.3 wt %) MA (24 wt %) | 80/20 | 7.2 |
| Exact 8230/EVS (1.3 wt %) MA (24 wt %) | 60/40 | 10.0 |
| Exact 8230/EVS (1.3 wt %) MA (24 wt %) | 20/80 | 42.3 |

0.45 mm films were made as described above. The films were cry cut at −100° Celsius and analysed with an AFM in AC-mode using a cantilever AC 200TS. The results were analysed with Asylum Software Analyse program. The soft phase indicates that the samples have phase separation. The table 6 shows that a copolymer of ethylene and vinyl trimethoxy silane together with a plastomer gives a one phase system while a terpolymer of ethylene, vinyl trimethoxy silane and methylacrylate gives a two phase system, which is bad for optical properties.

The invention claimed is:

1. A film layer made of a polymer composition comprising:
   (A) 10 to 50 wt % of a copolymer of ethylene with silane group(s) containing units having a density of from 910 kg/m$^3$ to 960 kg/m$^3$, and
   (B) at least 50 wt % of a thermoplastic polyolefin free from silane group(s) being a plastomer (E) having a density of from 860 kg/m$^3$ to 915 kg/m$^3$, wherein the densities are determined according to ISO1183D using test specimens according to ISO1872-2,
   wherein the polymer composition has creep of less than 1 mm at 90° C. during 48 hours, and an adhesion of above 20 N/cm.

2. The film layer according to claim 1, wherein the copolymer of ethylene (A) with a with silane group(s) containing units is in an amount from 10 to 45 wt %, based on the total weight of the polymer composition.

3. The film layer according to claim 1, wherein the thermoplastic polyolefin free from silane group(s) (B) is present in an amount from 60 to 90 wt %, based on the total weight of the polymer composition.

4. The film layer according to claim 1, wherein the total amount of silane group(s) in the polymer composition is less than 1 wt %.

5. The film layer according to claim 1, wherein the polymer composition has density of from 860 to 910 kg/m$^3$ and a MFR$_2$ of 1-10 g/10 min.

6. The film layer according to claim 1, wherein the polymer composition is free from peroxides.

7. The film layer according to claim 1, wherein the polymer composition has an UV stabilizer and an antioxidant present in an amount of 0.1 to 5 wt %, based on the total weight of the polymer composition.

8. The film layer according to claim 1, wherein the polymer composition comprises a condensation catalyst (F).

9. A laminated article comprising a substrate layer and at least one layer wherein the at least one layer comprises a polymer composition comprising:
  (A) 10 to 50 wt % of a copolymer of ethylene with silane group(s) containing units having a density of from 910 kg/m$^3$ to 960 kg/m$^3$, and
  (B) at least 50 wt % of a thermoplastic polyolefin free from silane group(s) being a plastomer (E) having a density of from 860 kg/m$^3$ to 915 kg/m$^3$, wherein the densities are determined according to ISO1183D using test specimens according to ISO1872-2,
  wherein the polymer composition has creep of less than 1 mm at 90° C. during 48 hours, and an adhesion of above 20 N/cm.

10. The laminated article according to claim 9, wherein the substrate layer is a glass layer.

11. The laminated article according to claim 9, wherein the polymer composition is laminated at 130° C. to 170° C.

12. The laminated article according to claim 9, wherein the copolymer of ethylene (A) with a with silane group(s) containing units is in an amount from 10 to 45 wt %, based on the total weight of the polymer composition.

13. The laminated article according to claim 9, wherein the thermoplastic polyolefin free from silane group(s) (B) is present in an amount from 60 to 90 wt %, based on the total weight of the polymer composition.

14. The laminated article according to claim 9, wherein the total amount of silane group(s) in the polymer composition is less than 1 wt %.

15. The laminated article according to claim 9, wherein the polymer composition has density of from 860 to 910 kg/m$^3$ and a MFR2 of 1-10 g/10 min.

16. The laminated article according to claim 9, wherein the polymer composition is free from peroxides.

17. The laminated article according to claim 9, wherein the polymer composition has an UV stabilizer and an antioxidant present in an amount of 0.1 to 5 wt %, based on the total weight of the polymer composition.

18. The laminated article according to claim 9, wherein the polymer composition comprises a condensation catalyst (F).

* * * * *